(12) United States Patent
Bouillet (10) Patent No.: US 8,290,464 B2
(45) Date of Patent: Oct. 16, 2012

(54) CO-CHANNEL INTERFERENCE REMOVER

(75) Inventor: Aaron Reel Bouillet, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 612 days.

(21) Appl. No.: 12/311,646

(22) PCT Filed: Nov. 1, 2006

(86) PCT No.: PCT/US2006/042365
§ 371 (c)(1),
(2), (4) Date: Apr. 7, 2009

(87) PCT Pub. No.: WO2008/054385
PCT Pub. Date: May 8, 2008

(65) Prior Publication Data
US 2010/0020235 A1   Jan. 28, 2010

(51) Int. Cl.
*H04B 1/10*   (2006.01)
(52) U.S. Cl. ...................................... 455/296
(58) Field of Classification Search ................. 455/296, 455/307
See application file for complete search history.

(56) References Cited

U.S. PATENT DOCUMENTS

| | | | |
|---|---|---|---|
| 4,903,297 A | 2/1990 | Rist et al. | |
| 5,222,106 A * | 6/1993 | Satoh et al. | 375/349 |
| 5,307,515 A * | 4/1994 | Kuo et al. | 455/295 |
| 5,444,743 A * | 8/1995 | Scarpa | 375/368 |
| 5,563,537 A | 10/1996 | Seta | |
| 5,748,226 A | 5/1998 | Limberg | |
| 6,233,295 B1 | 5/2001 | Wang | |
| 6,426,983 B1 | 7/2002 | Rakib et al. | |
| 6,807,405 B1 * | 10/2004 | Jagger et al. | 455/296 |
| 7,190,710 B2 * | 3/2007 | Yousef et al. | 375/148 |
| 7,194,050 B2 * | 3/2007 | Nicholls et al. | 375/346 |
| 7,292,830 B1 * | 11/2007 | Cheung et al. | 455/136 |
| 7,373,143 B2 | 5/2008 | Dygert | |
| 7,415,255 B2 * | 8/2008 | Wakui et al. | 455/130 |
| 7,436,911 B2 | 10/2008 | Fudge et al. | |
| 7,579,976 B1 | 8/2009 | Valentine et al. | |
| 7,876,869 B1 | 1/2011 | Gupta | |
| 2003/0016771 A1 | 1/2003 | Nuutinen et al. | |
| 2003/0123384 A1 * | 7/2003 | Agee | 370/208 |
| 2005/0190867 A1 | 9/2005 | Sobchak et al. | |
| 2005/0201498 A1 * | 9/2005 | Nakai | 375/346 |
| 2006/0092330 A1 | 5/2006 | Markman et al. | |

(Continued)

FOREIGN PATENT DOCUMENTS

JP   01320827   12/1989

(Continued)

OTHER PUBLICATIONS

United States Advanced Television Systems Committee, "ATSC Digital Television Standard," Document A/53, Sep. 16, 1995, 74 pages.

(Continued)

*Primary Examiner* — Thomas J Hiltunen
(74) *Attorney, Agent, or Firm* — Robert D. Shedd; Joseph J. Opalach (57) ABSTRACT

A receiver (a) translates a frequency spectrum of a received wideband signal such that a narrowband region of the wideband signal is applied to a filter for use in removing narrowband interference; and (b) tracks the narrowband interference by adjusting the frequency translation as a function of signal levels in narrowband regions adjacent to the narrowband interference region.

13 Claims, 11 Drawing Sheets

U.S. PATENT DOCUMENTS

| | | |
|---|---|---|
| 2006/0146200 A1 | 7/2006 | Edde et al. |
| 2008/0088736 A1* | 4/2008 | Bouillet ..................... 348/470 |
| 2009/0161804 A1 | 6/2009 | Chrabieh et al. |
| 2010/0020235 A1* | 1/2010 | Bouillet ..................... 348/500 |
| 2010/0029235 A1* | 2/2010 | Bouillet ..................... 455/226.2 |
| 2010/0112954 A1 | 5/2010 | Son |

FOREIGN PATENT DOCUMENTS

| | | |
|---|---|---|
| JP | 04265021 | 9/1992 |
| JP | 07030449 | 1/1995 |
| JP | 2000295120 | 10/2000 |
| JP | 2000307476 | 11/2000 |
| JP | 2000312155 | 11/2000 |
| JP | 05218890 | 8/2003 |
| WO | WO2004049704 | 6/2004 |

OTHER PUBLICATIONS

United States Advanced Television Systems Committee, "Guide to the Use of the ATSC Digital Television Standard," Document A/54, Oct. 4, 1995, 148 pages.

International Search Report, dated Jul. 20, 2007.

* cited by examiner

CO-CHANNEL INTERFERENCE REMOVER

This application claims the benefit, under 35 U.S.C. §365 of International Application PCT/US2006/042365 filed Nov. 1, 2006 which was published in accordance with PCT Article 21(2) on May 8, 2008 in English.

BACKGROUND OF THE INVENTION

The present invention generally relates to communications systems and, more particularly, to a receiver.

Figure 1:
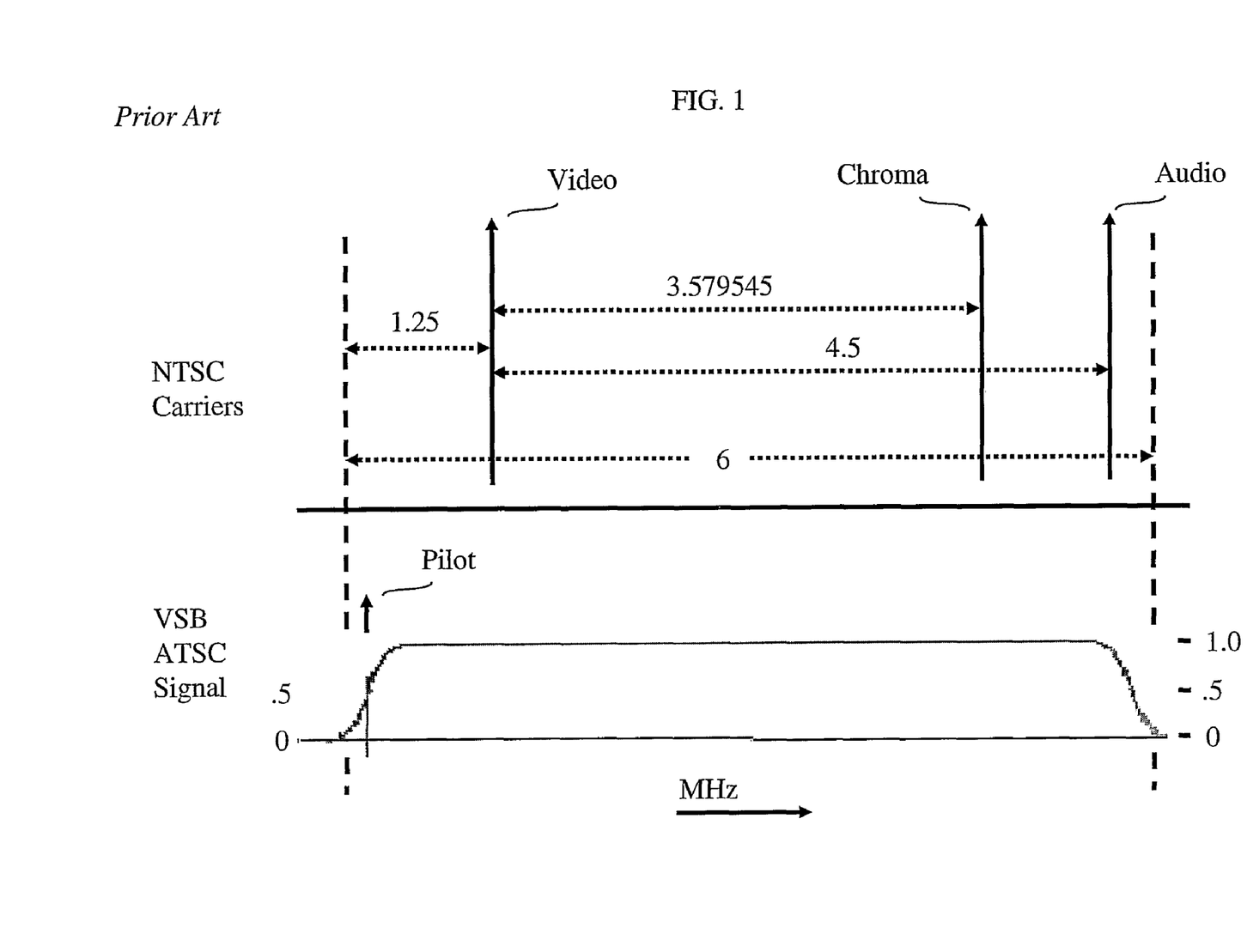
FIG. 1 shows a comparison of an NTSC signal spectrum and a ATSC signal spectrum.

In some communications systems it is desirable to detect the presence of a co-channel interfering signal and remove it. For example, during the transition from analog to digital terrestrial television in the United States, both analog NTSC (National Television Systems Committee) based transmissions and digital ATSC-HDTV (Advanced Television Systems Committee-High Definition Television) based transmissions are expected to co-exist for a number of years. As such, an NTSC broadcast signal and an ATSC broadcast signal may share the same 6 MHz wide (millions of hertz) channel. This is illustrated in FIG. 1, which shows the relative spectral positions of the NTSC signal carriers (video, audio and chroma) with respect to the digital VSB (Vestigial Sideband) ATSC signal spectrum. Thus, an ATSC receiver must be able to efficiently detect and reject NTSC co-channel interference.

In an ATSC-HDTV digital receiver, NTSC co-channel interference rejection may be performed by the comb filter (e.g., see, United States Advanced Television Systems Committee, "ATSC Digital Television Standard", Document A/53, Sep. 16, 1995). The comb filter is a 12 symbol linear feedforward filter with spectral nulls at or near the NTSC signal carriers, and is only applied when NTSC interference is detected (e.g., see, United States Advanced Television Systems Committee, "Guide to the Use of the ATSC Digital Television Standard", Document A/54, Oct. 4, 1995). Tests have shown that the comb filter performs efficient NTSC signal rejection for D/U (Desired-to-Undesired) signal power ratios up to 16 dB (decibels). The D/U signal power ratio is defined as the average digital VSB ATSC signal power divided by the peak NTSC signal power.

As such, the method of removing NTSC co-channel interference is typically to leave the comb filter enabled in the data path and compensate for its presence in a convolutional decoder of the receiver. Unfortunately, this adds much complexity and cost to the hardware implementation.

SUMMARY OF THE INVENTION

In accordance with the principles of the invention, a receiver (a) translates a frequency spectrum of a received wideband signal such that a narrowband region of the wideband signal is applied to a filter for use in removing narrowband interference; and (b) tracks the narrowband interference by adjusting the frequency translation as a function of signal levels in narrowband regions adjacent to the narrowband interference region.

In an illustrative embodiment of the invention, a receiver includes a frequency synthesizer and a multiplier for translating a frequency spectrum of a received wideband signal, a lowpass filter for removing narrowband interference, and bandpass filters for use in measuring power levels of signals adjacent to the narrow band interference for generating an error signal for use in adjusting the frequency synthesizer to track the narrowband interference.

In view of the above, and as will be apparent from reading the detailed description, other embodiments and features are also possible and fall within the principles of the invention.

DETAILED DESCRIPTION

Other than the inventive concept, the elements shown in the figures are well known and will not be described in detail. Also, familiarity with television broadcasting and receivers is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire), ATSC (Advanced Television Systems Committee) (ATSC) and VBI encoding is assumed. Likewise, other than the inventive concept, transmission concepts such as eight-level vestigial sideband (8-VSB), Quadrature Amplitude Modulation (QAM), and receiver components such as a radio-frequency (RF) front-end, or receiver section, such as a low noise block, tuners, and demodulators is assumed. Similarly, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

Figure 2:
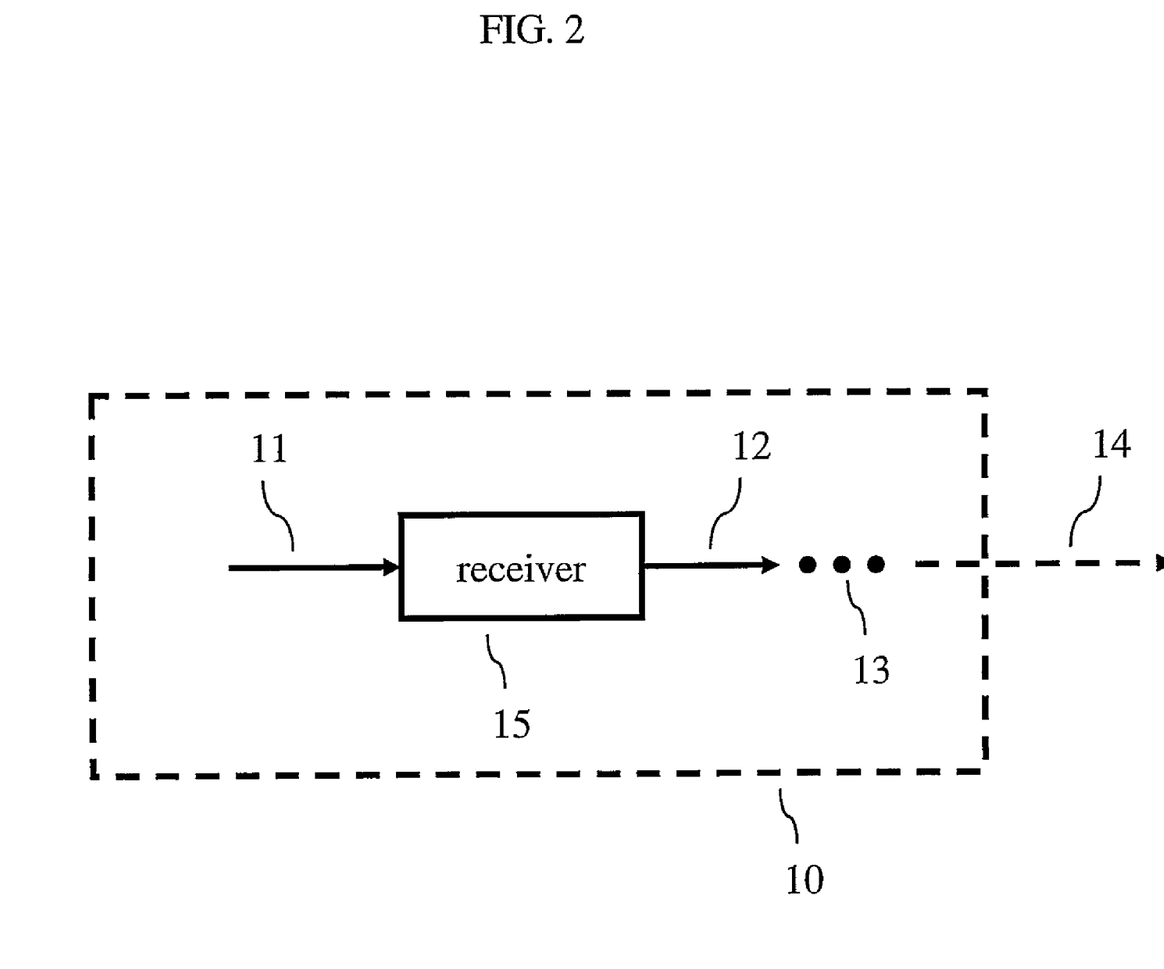
FIG. 2 shows an illustrative high-level block diagram of a receiver embodying the principles of the invention.

A high-level block diagram of an illustrative device 10 in accordance with the principles of the invention is shown in FIG. 2. Device 10 includes a receiver 15. As described below, receiver 15 functions in accordance with the principles of the invention for receiving a broadcast signal 11 and for providing an output signal 12. Illustratively, device 10 may be a set-top box (cable, satellite, etc.), TV set, personal computer, mobile phone (e.g., with video output), etc. In this regard, the output signal 12 may be further processed by device 10 (as represented by the ellipses 13) before being transmitted to another device, or provided to a display, as represented by dashed arrow 14. For example, in the context of a set-top box, dashed arrow 14 may represent a re-modulated video signal (e.g., at a frequency corresponding to channel 4); or, in the context of a flat-panel TV, dashed arrow 14 may represent a base band video signal before application to a display element (e.g., a flat-panel, cathode-ray-tube (CRT), etc.).

In this example, receiver 15 is an ATSC-compatible receiver. However, the inventive concept is not so limited. In this ATSC illustration, it should also be noted that receiver 15 may be NTSC-compatible, i.e., have an NTSC mode of operation and an ATSC mode of operation such that receiver 15 is capable of processing video content from an NTSC broadcast or an ATSC broadcast. In this regard, receiver 15 is an example of a multimedia receiver. However, in the context of this description, the ATSC mode of operation is described. Receiver 15 receives a broadcast signal 11 (e.g., via an antenna (not shown)) for processing to recover therefrom an output video signal 12, e.g., an HDTV signal for application to a display (not shown) for viewing video content thereon. As noted above, and shown in FIG. 1, broadcast signal 11 is a wideband signal and may include not only a broadcast ATSC signal but also interference from a co-channel broadcast NTSC signal. In this regard, receiver 15 of FIG. 2 includes a rejection filter in accordance with the principles of the invention for removing the NTSC signal interference and also includes an interference detector.

Figure 3:
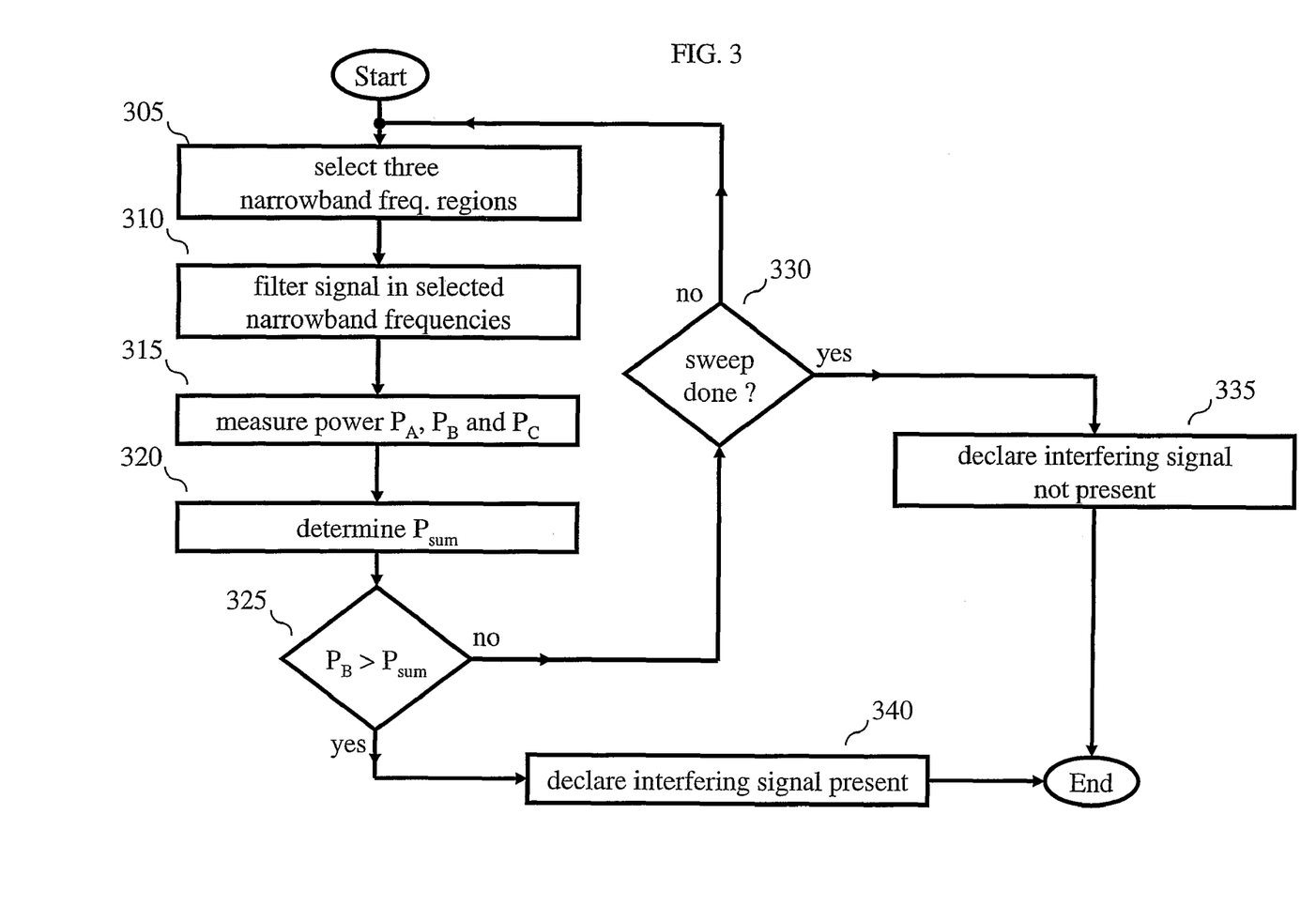
FIG. 3 shows an illustrative flow chart for use in receiver 15 of FIG. 2.
Figure 4:
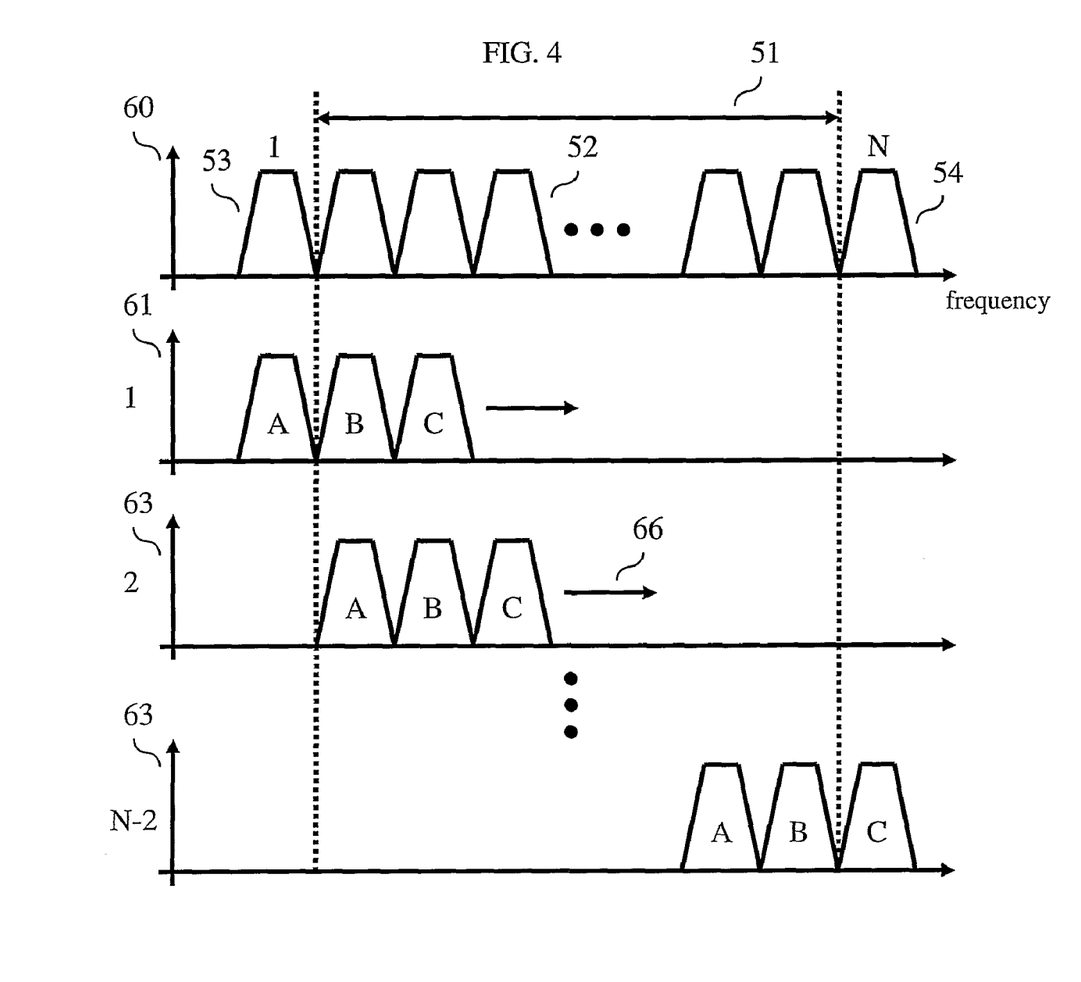
FIG. 4 shows a frequency spectrum for use in understanding the flow chart of FIG. 3.

Turning now to FIG. 3, an illustrative flow chart for use in receiver 15 is shown. At this point reference should also be made to FIG. 4, which illustrates operation of the flow chart of FIG. 3 with respect to an illustrative wideband frequency channel 51. As can be observed from graph 60 of FIG. 4, a wideband frequency channel 51 is divided into N-2 narrowband frequency regions (52). These narrowband frequency regions have the same bandwidth. In addition, at the boundaries of wideband frequency channel 51, two additional narrowband frequency regions are designated, 53 and 54. As such, the total number of narrowband frequency regions is N. These N narrowband frequency regions are examined in groups of K to determine if a narrowband interfering signal is present. In this example, K=3. Returning to FIG. 3, in step 305, receiver 15 selects the first three narrowband frequency regions. The three selected narrowband frequency regions are designated as A, B and C. This is also illustrated in FIG. 4 in graph 61. In step 310, receiver 15 filters the received signal in these three narrowband frequency regions and, in step 315, receiver 15 measures the corresponding power levels, $P_A$, $P_B$ and $P_C$ of the resulting narrowband signals. These power measurements can be done as known in the art, e.g., either through dedicated multiply-and-accumulate hardware, or a microprocessor routine that reads stored filter output samples and performs the multiply accumulate through a software routine. After having measured the power levels of any signals in the three narrowband frequency regions, receiver 15 calculates a power parameter as a function of the measured powered levels, $P_A$ and $P_C$, of the outer narrowband frequency regions in step 320. In this example, the following power parameter is determined:

$$P_{sum}=(P_A+P_C)/2 \quad (1)$$

However, it should be noted that other equations could be used. For example, the measurement performed in equation (1) can be averaged to take into account any spectrum tilt due to multipath effects. Further, other linear or non-linear combinations may be used. Finally, in step 325, receiver 15 compares the measured power level $P_B$ of the middle narrowband frequency region to $P_{sum}$. If the measured power level $P_B$ is less than, or equal to, $P_{sum}$ then receiver 15 checks in step 330 if the entire wideband frequency channel has been swept. If the entire wideband frequency channel has not been swept yet, then receiver 15 selects the next three narrowband frequency channels. This is illustrated in graph 62 of FIG. 4. As such, the next three narrowband frequency regions are again designated as narrowband frequency regions A, B and C and receiver 15 repeats steps 310, etc. Thus, it can be observed from FIG. 4, that the entire wideband frequency channel 51 is swept in the direction of arrow 66 for the presence of a narrowband interfering signal. On the last pass (pass N-2), illustrated in graph 63 of FIG. 4, the last three narrowband frequency regions are examined. It can also be observed from FIG. 4, in view of step 325 of FIG. 3, that the narrowband regions 53 and 54 at the boundary facilitate the examination of the first and last narrowband frequency regions of wideband frequency channel 51. Once receiver 15 determines in step 330 that the entire wideband frequency has been swept without the detection of a narrowband interfering signal, receiver 15 declares an interfering signal is not present in step 335.

However, in step 325 of FIG. 3, if the measured power level $P_B$ is greater than $P_{sum}$, then receiver 15 declares a narrowband interfering signal is present in step 340. It should be noted that other variations are possible. For example, receiver 15 may declare a narrowband interfering signal is present only when $P_B$ is substantially greater than $P_{sum}$. Once it is determined whether a narrowband interfering signal is present or not, receiver 15 continues processing (not shown).

Figure 5:
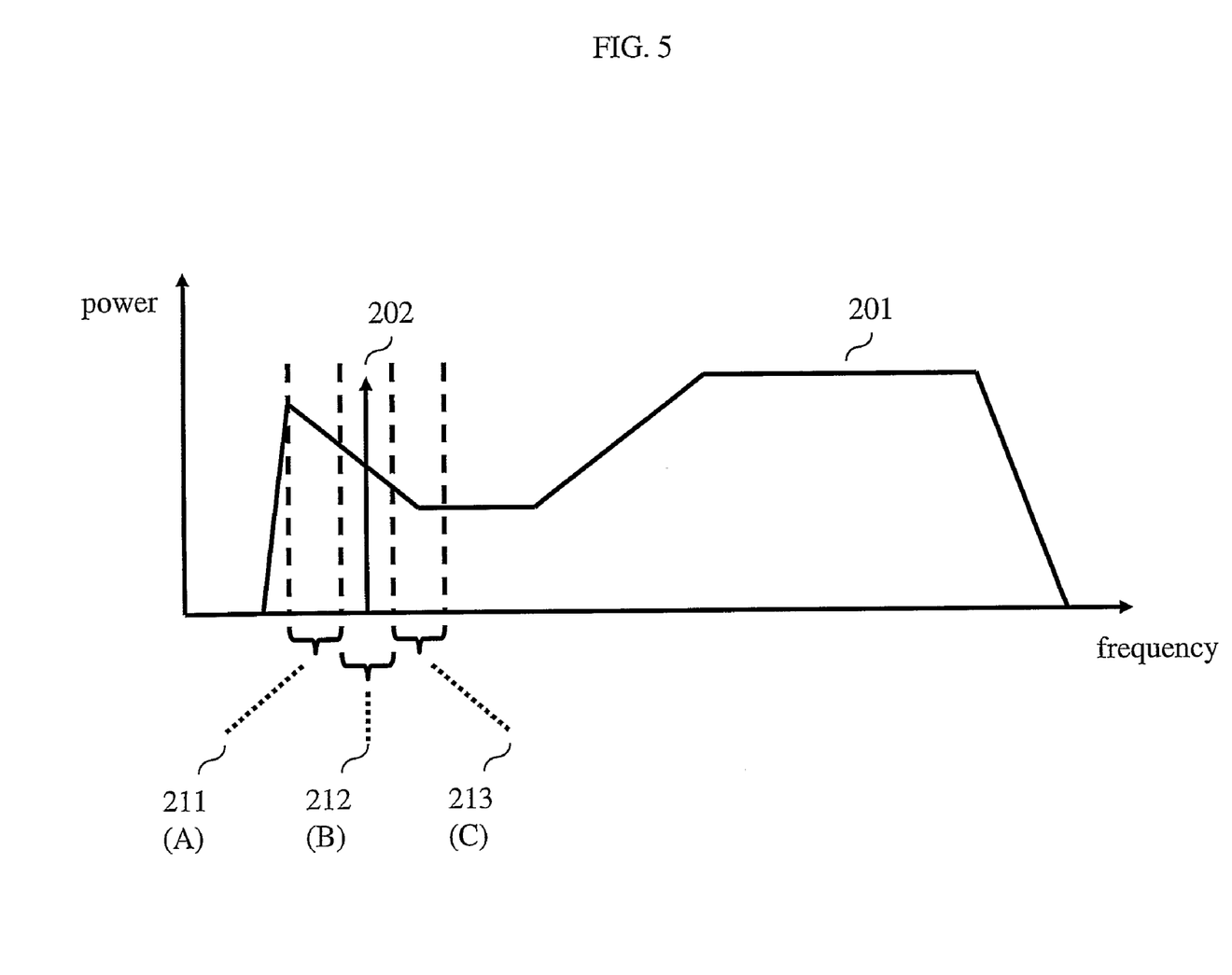
FIG. 5 shows another frequency spectrum for use in understanding the flow chart of FIG. 3.

It should be noted that even though receiver 15 detects a narrowband interferer, it may be the case that the narrowband interferer is merely representative of the presence of a co-channel interferer, which can be wideband or narrowband. This is illustrated in FIG. 5 in the context of receiver 15 being part of an ATSC system. FIG. 5 shows an illustrative frequency spectrum for a broadcast ATSC signal 201 and an NTSC co-channel interfering signal as represented by the presence of an NTSC video carrier 202. As can be observed from FIG. 5, and in accordance with the flow chart of FIG. 3, receiver 15 will eventually examine three narrowband frequency regions, 211(A), 212(B) and 213(C). In step 325 of FIG. 3, receiver 15 will detect the presence of NTSC video carrier 202 within narrowband frequency region 212(B). As such, receiver 15 will declare in step 340 the presence of an NTSC co-channel interferer.

In view of the above, a wideband frequency channel is examined, or sampled, for the presence of at least one interfering signal. It should be noted that variations to the flow chart of FIG. 3 are possible. For example, a priori knowledge of the frequency characteristics of the possible interfering signals may allow modification of the flow chart of FIG. 3 such that only portions of the wideband frequency channel are examined. Likewise, step 340 may be modified to also record the narrowband frequency region that contains the interfering signal. Similarly, it may be the case that the sweep continues even after the detection of a first interfering signal to determine the presence and/or location of other interfering signals. Finally, although arrow 66 of FIG. 4 illustrated one particular direction for the sweep, the wideband frequency channel, or portions thereof, can be examined in any order or direction.

Figure 6:
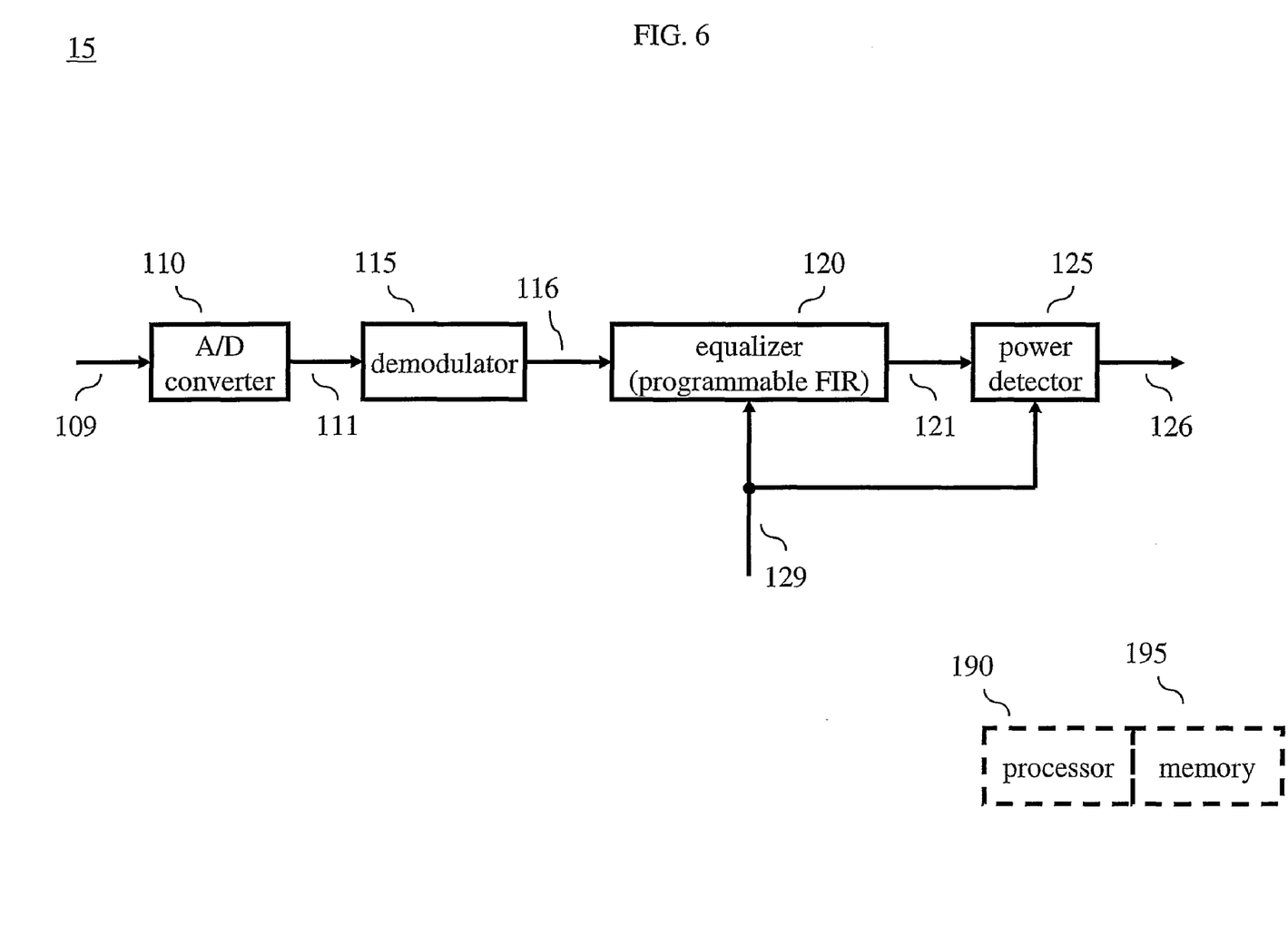
FIG. 6 shows an illustrative embodiment for use in receiver 15 of FIG. 2.

Turning now to FIG. 6, an illustrative portion of receiver 15 including an interference detector is shown for use in the flow chart of FIG. 3. Receiver 15 is a processor-based system and includes one, or more, processors and associated memory (not shown) as represented in dashed line form by processor 190 and memory 195. In this context, the associated memory is used to store computer programs, or software, which is executed by processor 190, and to store data. Processor 190 is representative of one, or more, stored-program control processors and these do not have to be dedicated to the interference detection function, e.g., processor 190 may also control other functions of device 10. Continuing with the description of receiver 15, an RF front-end (not shown) provides a down-converted signal 109. Down-converted signal 109 is provided to A/D converter 110, which samples the down converted signal 109 to convert the signal to the digital domain and provide a sequence of samples 111 to demodulator 115. The latter comprises automatic gain control (AGC), symbol timing recovery (STR), carrier tracking loop (CTL), and other functional blocks as known in the art for demodulating signal 111 to provide demodulated signal 116 to equalizer 120. The equalizer 120 includes a programmable finite impulse response (FIR) filter (not shown) for processing demodulated signal 116. It should be noted that equalizer 120 is not adapting to the input signal. In particular, equalizer 120 is "frozen" and taps of the FIR section have been programmed to be a bandpass filter at some specific spectral location. It should also be noted that it is possible to implement an infinite impulse response (IIR) filter to achieve the same effective power response as a bandpass filter. In fact, since the phase properties of the output signal are irrelevant in this application, use of an IIR filter may lead to a simplified implementation. Equalizer 120 provides signal 121 to power detector 125, which processes signal 121 and provides a signal 126, which is representative of whether or not an interfering signal is present. In particular, for every K=3 narrowband frequency regions, processor 190 sets, via control signal 119, the programmable FIR of equalizer 120 to one of the narrowband frequency regions A, B and C, for filtering demodulated signal 116 (step 310 of FIG. 3). Processor 190 controls, via control signal 119, power detector 125 for measuring a corresponding power level $P_A$, $P_B$ and $P_C$, of signal 121 when equalizer 120 is tuned to narrowband frequency region A, B and C, respectively (step 315 of FIG. 3). After having measured the power levels of any signals in the three narrowband frequency regions, power detector 125 calculates $P_{sum}$, in accordance with equation (1) (step 320 of FIG. 3). Finally, power detector 125 compares the measured power level $P_B$ to $P_{sum}$ (step 325 of FIG. 3). If power detector 125 does not declare an interfering signal is present, via signal 126, processor 190 continues to sweep the wideband frequency channel, as described above, and selects the next three narrowband frequency regions. However, if power detector 125 declares, via signal 126, that an interfering signal is present (step 340 of FIG. 3), processor 190 marks the narrowband frequency region as containing an interfering signal.

Figure 7:
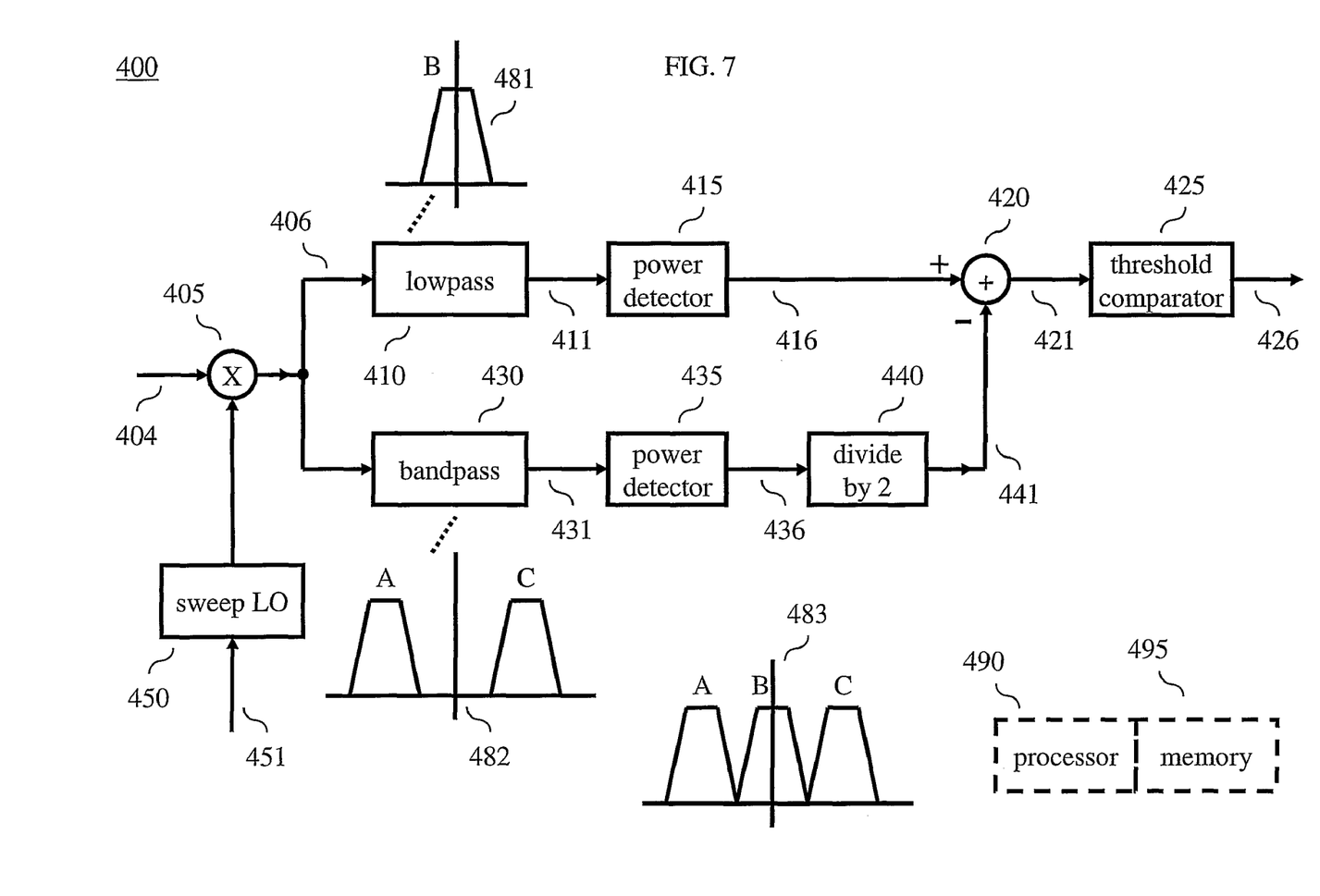
FIG. 7 shows another illustrative embodiment for use in receiver 15 of FIG. 2.

Referring now to FIG. 7, another illustrative embodiment of an interference detector 400 for use receiver 15 is shown for use in the flow chart of FIG. 3. Illustratively, detector 400 is a processor-based system and includes one, or more, processors and associated memory (not shown) as represented in dashed line form by processor 490 and memory 495. Detector 400 comprises a sweep local oscillator (LO) 450, a multiplier (mixer) 405, selection filters 410 and 430, power detectors 415 and 435, divide by 2 element 440, adder 420 and threshold comparator 425. The frequency of sweep LO 450 is adjusted by processor 490 via control signal 451. Selection filters 410 and 430 represent a lowpass filter and a bandpass filter, respectively. Lowpass filter 410 has an illustrative frequency response 481 for filtering the middle narrowband frequency region B. Similarly, bandpass filter 430 has an illustrative frequency response 482 for filtering the outer narrowband frequency regions A and C. As a result, three narrowband frequency regions are filtered as illustrated by frequency response 483. As the frequency of sweep LO 450 is adjusted by processor 490 (step 305 of FIG. 3), multiplier 405 frequency shifts input signal 404 to provide a signal 406 to lowpass filter 410 and bandpass filter 430. Signal 406 is also referred to herein as the "conversion image" of signal 404. As a result, by changing the frequency of sweep LO 450 the frequency range of signal 406 can be shifted such that selection filters 410 and 430 filter different regions of the wideband frequency channel. As such, lowpass filter 410 filters the middle narrowband frequency region B and bandpass filter 430 filters the outer narrowband frequency regions A and C for each selected frequency region of the wideband frequency channel (step 310 of FIG. 3). The sweep LO signal can move in steps, then wait for the power detectors 415 and 435 to accumulate enough samples from filtered signals 411 and 431, respectively, to provide measured power levels 416 and 436, respectively. As described above, power detector 415 provides measured power level $P_B$, via signal 416, and power detector 435 provides the sum of $P_A$ and $P_C$, via signal 436, which is then divided by two by element 440 to provide $P_{sum}$, via signal 441 (steps 315 and 320). Adder 420 subtracts $P_{sum}$ from $P_B$ and provides the resultant signal 421 to threshold comparator 425 for indicating the presence of an interfering signal via signal 426 (steps 325 and 340). If no interfering signal is detected, then the frequency of sweep LO is adjusted to examine the next three narrowband frequency regions, etc. As such, detector 400 can examine a wideband frequency channel either in its entirety, or portions thereof, for the presence of an interfering signal.

As noted above, it may be the case that, upon detection of an interfering signal, receiver 15 attempts to remove, or reject, the interfering signal. An example of this is provided by the above-mentioned comb filter in the context of an NTSC co-channel interfering signal for use in an ATSC system. As such, the method of removing NTSC co-channel interference is typically to leave the comb filter enabled in the data path and compensate for its presence in a convolutional decoder (not shown) of the receiver. This adds much complexity and cost to the hardware implementation. Therefore, and in accordance with the principles of the invention, a receiver (a) translates a frequency spectrum of a received wideband signal such that a narrowband region of the wideband signal is applied to a filter for use in removing narrowband interference; and (b) tracks the narrowband interference by adjusting the frequency translation as a function of signal levels in narrowband regions adjacent to the narrowband interference region.

Figure 8:
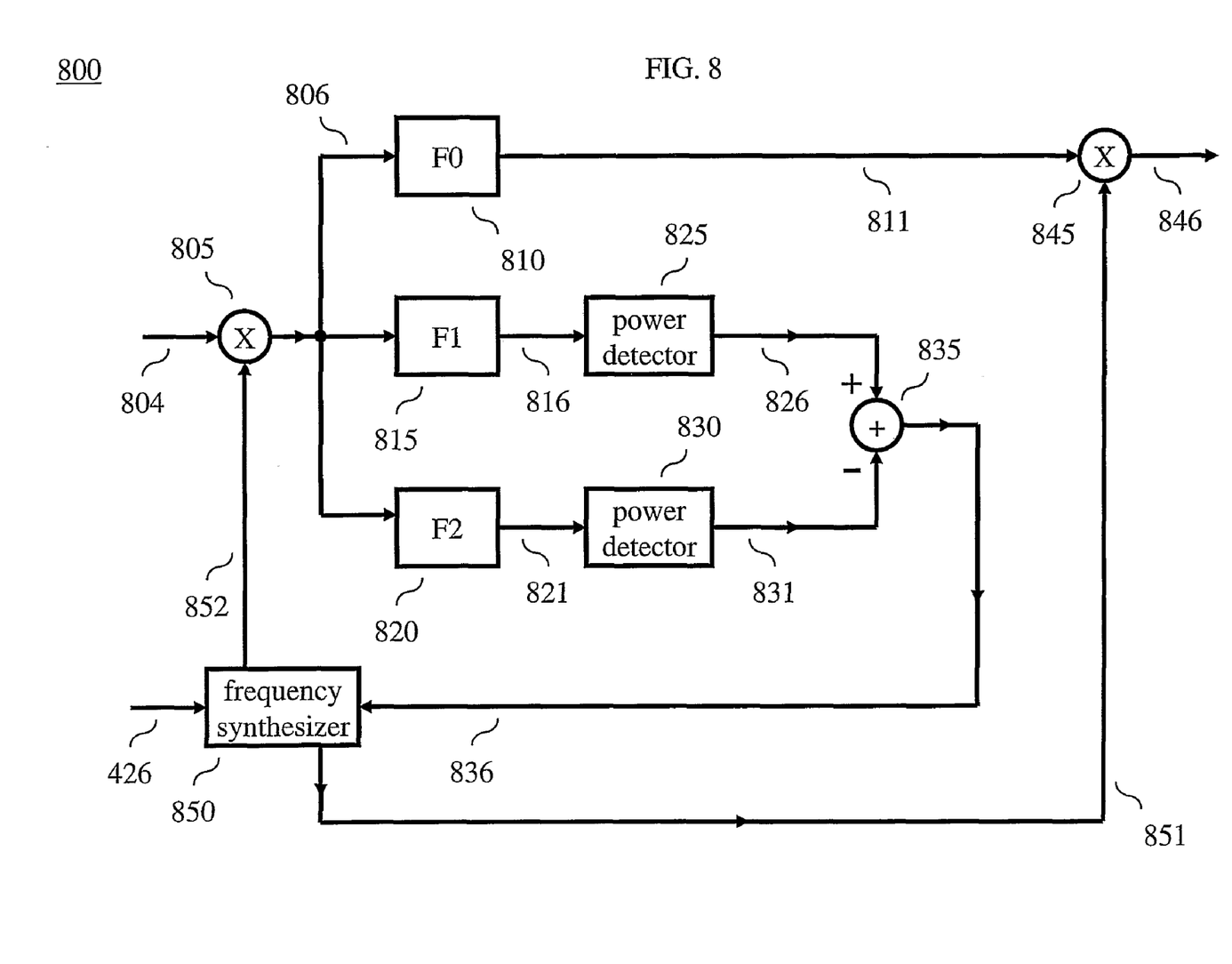
FIGS. 8 and 9 show an illustrative embodiment of a narrowband interference remover in accordance with the principles of the invention.
Figure 9:
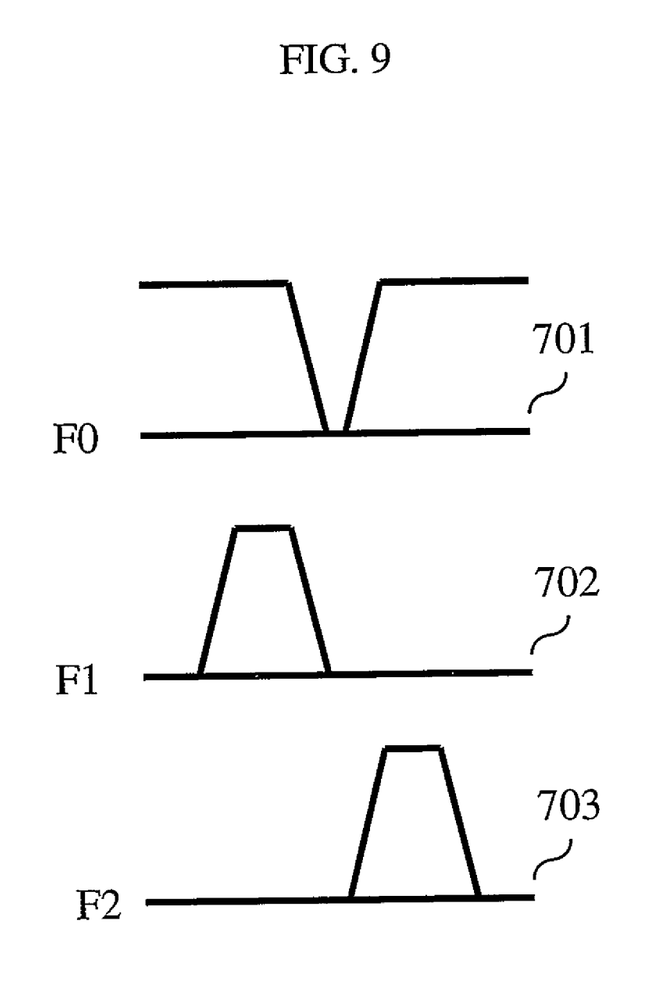

An illustrative narrowband interference remover 800 in accordance with the principles of the invention is shown in FIGS. 8 and 9 that reduces this complexity and cost. It should be noted that narrowband interference remover 800 is not limited to removing NTSC co-channel interference and can be used to remove other types of narrowband interference. Narrowband interference remover 800 comprises multipliers (mixers) 805 and 845, frequency synthesizer 850, selection filters 810, 815 and 820, power detectors 825 and 830, and adder 835. Frequency synthesizer 850 is alerted to the detection of a narrowband interfering signal, e.g., via signal 426 of FIG. 7. In this example, it is assumed that signal 426 also includes information as to the narrowband frequency region containing the interfering signal. Upon detection of a narrowband interfering signal, frequency synthesizer 850 generates a frequency, via signal 852, to multiplier 805 for frequency shifting input signal 804, which is representative of the received wideband signal, for removing the presence of a detected narrowband interfering signal. In this regard, selection filters have frequency responses as illustrated in FIG. 9. In particular, multiplier 805 moves the narrowband interference to DC and selection filter 810 attenuates the interferer via a notch-type response as illustrated by frequency response 701. As a result, selection filter 810 removes the detected narrowband interference and provides filtered signal 811 to multiplier 845. The latter receives a complimentary frequency from frequency synthesizer 850, via signal 851, so that the signal spectrum of output signal 846 is restored to its input spectral location (i.e., the same as that of input signal 804). Selection filters 815 and 820 filter frequency regions adjacent to the detected narrowband interference as illustrated by frequency responses 702 and 703.

It should be noted that selection filters 815 and 820 act to keep the selection filter 810 squarely on the interference in the event that the interferer drifts in frequency after detection or if the initial frequency estimate is slightly in error. For example, if the interference drifts down in frequency, i.e., more toward the frequency region of selection filter 815, then the power level of signal 816 as detected by power detected 825 will increase, while the power level of signal 821, from selection filter 820, as detected by power detected 830 will decrease. Adder 835 is used to generate an error signal 836 from the measured power levels 826 and 831 provided by power detector 825 and 830, respectively. Frequency synthesizer 850 is responsive to error signal 836 to suitably adjust the frequency of signal 852 to reduce its frequency output—thus tracking the narrowband interference. In like fashion, the converse holds for the case where the interferer drifts up in frequency, i.e., more toward the frequency region of selection filter 820. In this case, error signal 836 causes frequency synthesizer 850 to increases the frequency of signal 852. It should be noted that the embodiment of FIG. 8 can be modified to handle multiple interfering signals. For example, in order to handle N multiple narrowband interferers, N detector circuits described above can be implemented in parallel to drive a corresponding N set of interference rejection circuits operating in series.

Figure 10:
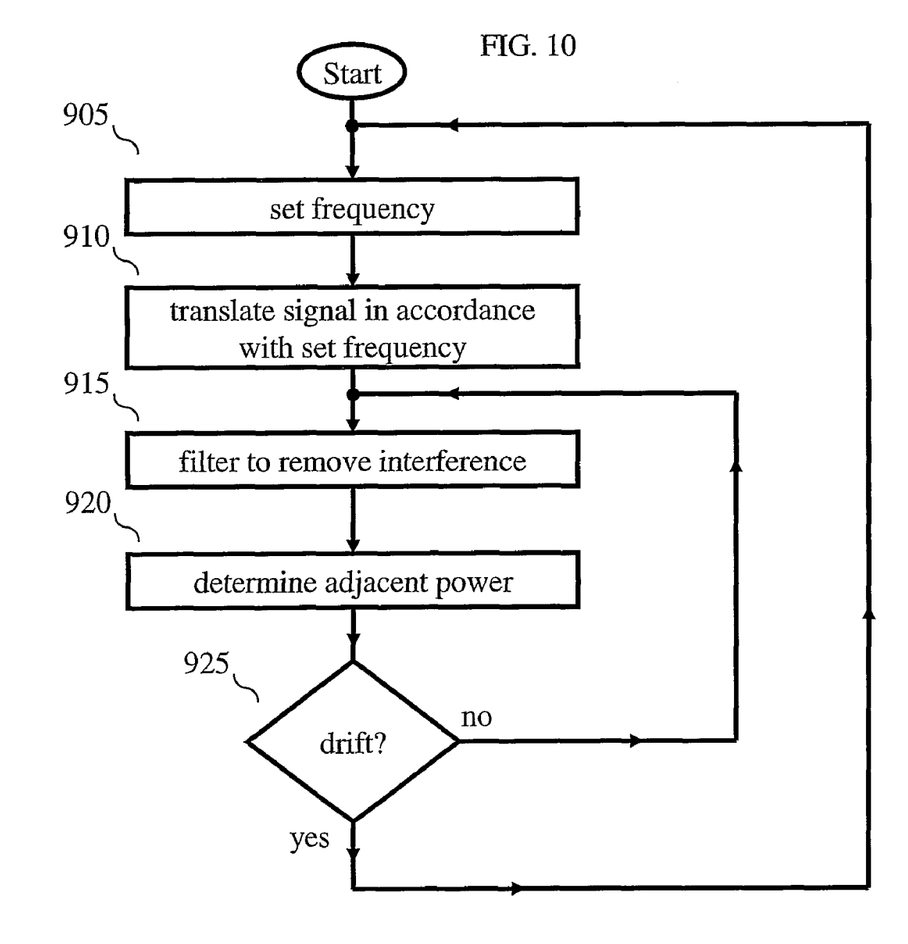
FIG. 10 shows an illustrative flow chart in accordance with the principles of the invention.

An illustrative flow chart in accordance with the principles of the invention is shown in FIG. 10. In step 905, receiver 15 sets the frequency for translating a received wideband signal. This frequency is, e.g., provided by the above described narrowband interference detectors of FIG. 3, 6 or 7. In step 910, receiver 15 translates the received wideband signal in accordance with the set frequency. In step 915, receiver 15 removes narrowband interference from the translated wideband signal (e.g., by filtering). In step 920, receiver 15 measures power levels in narrowband frequency regions adjacent to the detected narrowband interference region. In step 925, receiver 15 determines whether or not the narrowband interference has drifted by comparing the power levels. If the narrowband interference has drifted, receiver 15 adjusts the frequency in step 905 as a function of the power level comparison and continues again with the following steps. On the other hand, if the narrowband interference has not drifted, receiver 15 continues with step 915.

Figure 11:
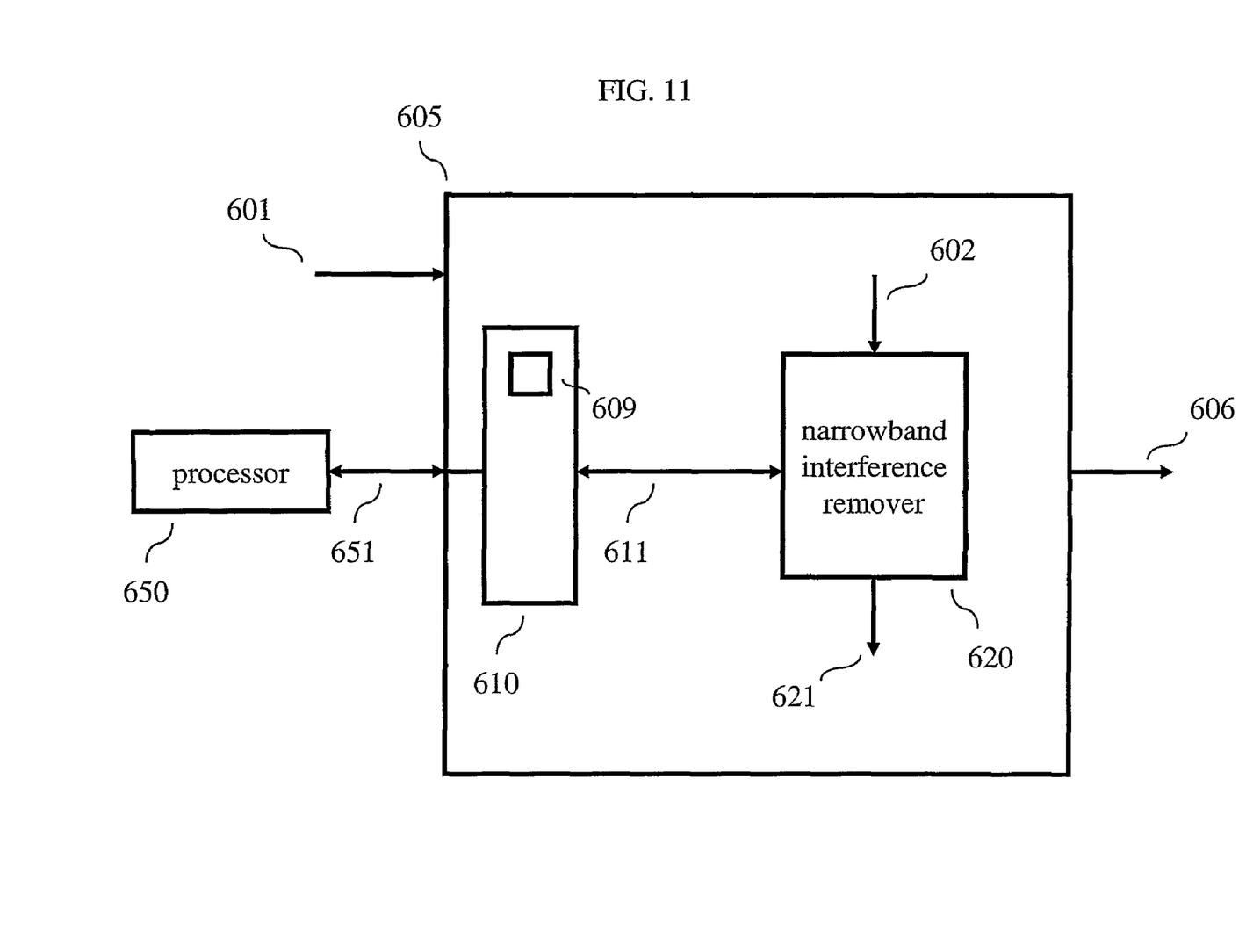
FIG. 11 shows another illustrative embodiment in accordance with the principles of the invention.

Another illustrative embodiment of the inventive concept is shown in FIG. 11. In this illustrative embodiment an integrated circuit (IC) 605 for use in a receiver (not shown) includes a narrowband frequency remover 620 and at least one register 610, which is coupled to bus 651. Illustratively, IC 605 is an integrated analog/digital television decoder. However, only those portions of IC 605 relevant to the inventive concept are shown. For example, analog-digital converters, filters, decoders, etc., are not shown for simplicity. Bus 651 provides communication to, and from, other components of the receiver as represented by processor 650. Register 610 is representative of one, or more, registers, of IC 605, where each register comprises one, or more, bits as represented by bit 609. The registers, or portions thereof, of IC 605 may be read-only, write-only or read/write. In accordance with the principles of the invention, narrowband frequency remover 620 includes the above-described interference remover feature, or operating mode, and at least one bit, e.g., bit 609 of register 610, is a programmable bit that can be set by, e.g., processor 650, for enabling or disabling this operating mode. In the context of FIG. 11, IC 605 receives an IF signal 601 for processing via an input pin, or lead, of IC 605. A derivative of this signal, 602, is applied to narrowband frequency remover 620 for removing narrowband interference as described above. Narrowband frequency remover 620 provides signal 621, which is the filtered signal (e.g., signal 846 of FIG. 8). Narrowband frequency remover 620 is coupled to register 610 via internal bus 611, which is representative of other signal paths and/or components of IC 605 for interfacing narrowband frequency remover 620 to register 610 as known in the art (e.g., to read the earlier-described integrator and counter values). IC 605 provides one, or more, recovered signals, e.g., a composite video signal, as represented by signal 606. It should be noted that other variations of IC 605 are possible in accordance with the principles of the invention, e.g., external control of this operating mode, e.g., via bit 610, is not required and IC 605 may simply always perform the above-described processing for removing a narrowband interfering signal.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements may be implemented in a stored-program-controlled processor, e.g., a digital signal processor or microprocessor, which executes associated software, e.g., corresponding to one or more of the steps shown in FIG. 10. For example, the above-described narrowband interference remover may be representative of hardware, and/or one or more software subroutines that processes the received signal. Further, although shown as elements bundled within receiver 15, the elements of receiver 15 may be distributed in different units or devices. It is therefore to be understood that numerous modifications may be made to the illustrative embodiments and that other arrangements may be devised without departing from the spirit and scope of the present invention as defined by the appended claims.

The invention claimed is:

1. A method for use in a receiver, the method comprising:
 identifying a narrowband interference region in a frequency spectrum of a received wideband signal;
 setting a frequency synthesizer in accordance with the identified narrowband interference region;
 translating the frequency spectrum of the received wideband signal in accordance with the frequency synthesizer;
 filtering the translated received wideband signal so as to remove an interfering signal from the translated received wideband signal; and
 tracking the interfering signal by adjusting the frequency synthesizer as a function of signal levels in narrowband frequency regions adjacent to the narrowband interference region, the tracking step including:
  filtering the narrowband frequency regions adjacent to the narrowband interference region in the translated received wideband signal; and
  determining the signal levels in the narrowband frequency regions.

2. The method of claim 1, wherein the signal levels are power levels.

3. The method of claim 1, wherein bandwidths of the adjacent narrowband frequency regions are the same.

4. The method of claim 1, wherein the tracking step comprises:
   comparing the signal levels in the narrowband regions adjacent to the narrowband interference region to determine an amount of drift in the narrowband interference; and
   adjusting the frequency synthesizer as a function of the amount of drift.

5. The method of claim 1, wherein the received wideband signal is an ATSC-HDTV (Advanced Television Systems Committee-High Definition Television) signal.

6. The method of claim 1, wherein identifying a narrowband interference region includes (a) measuring a power level of a first signal in a first narrowband frequency region of a wideband frequency channel; (b) measuring power levels of signals in narrowband frequency regions adjacent to the first narrowband frequency region; and (c) determining if the first signal is an interfering signal in the wideband frequency channel as a function of the measured power levels.

7. Apparatus comprising:
   a narrowband interference detector for use in identifying a narrowband interference region in a frequency spectrum of a received wideband signal;
   a frequency synthesizer, the frequency synthesizer being set in accordance with the identified narrowband interference region;
   a frequency translator for use in translating the frequency spectrum of the received wideband signal in accordance with the frequency synthesizer;
   a filter for use in removing an interfering signal from the translated received wideband signal; and
   an interference tracker for tracking the interfering signal by adjusting the frequency synthesizer as a function of signal levels in narrowband frequency regions adjacent to the narrowband interference region, the interference tracker filtering the narrowband frequency regions adjacent to the narrowband interference region in the translated received wideband signal, and determining the signal levels in the narrowband frequency regions.

8. The apparatus of claim 7, wherein the frequency translator comprises an adjustable local oscillator and a multiplier.

9. The apparatus of claim 7, wherein the signal levels are power levels.

10. The apparatus of claim 7, wherein bandwidths of the adjacent narrowband frequency regions are the same.

11. The apparatus of claim 7, wherein the received wideband signal is an ATSC-HDTV (Advanced Television Systems Committee-High Definition Television) signal.

12. The apparatus of claim 7, wherein the interference tracker compares the signal levels in the narrowband regions adjacent to the narrowband interference region to determine an amount of drift in the narrowband interference and adjusts the frequency synthesizer as a function of the amount of drift.

13. The apparatus of claim 7, wherein the narrowband interference detector includes an adjustable narrowband filter for filtering a received wideband signal in three narrowband frequency regions for providing three filtered narrowband signals, wherein one narrowband frequency region is adjacent to the other two narrowband frequency regions; and a power detector for measuring a power level of each of the three filtered narrowband signals and for determining if an interfering signal is present as a function of the measured power levels.

* * * * *